E. BEADLE.
Hay and Cotton Press.
No. 216,642. Patented June 17, 1879.
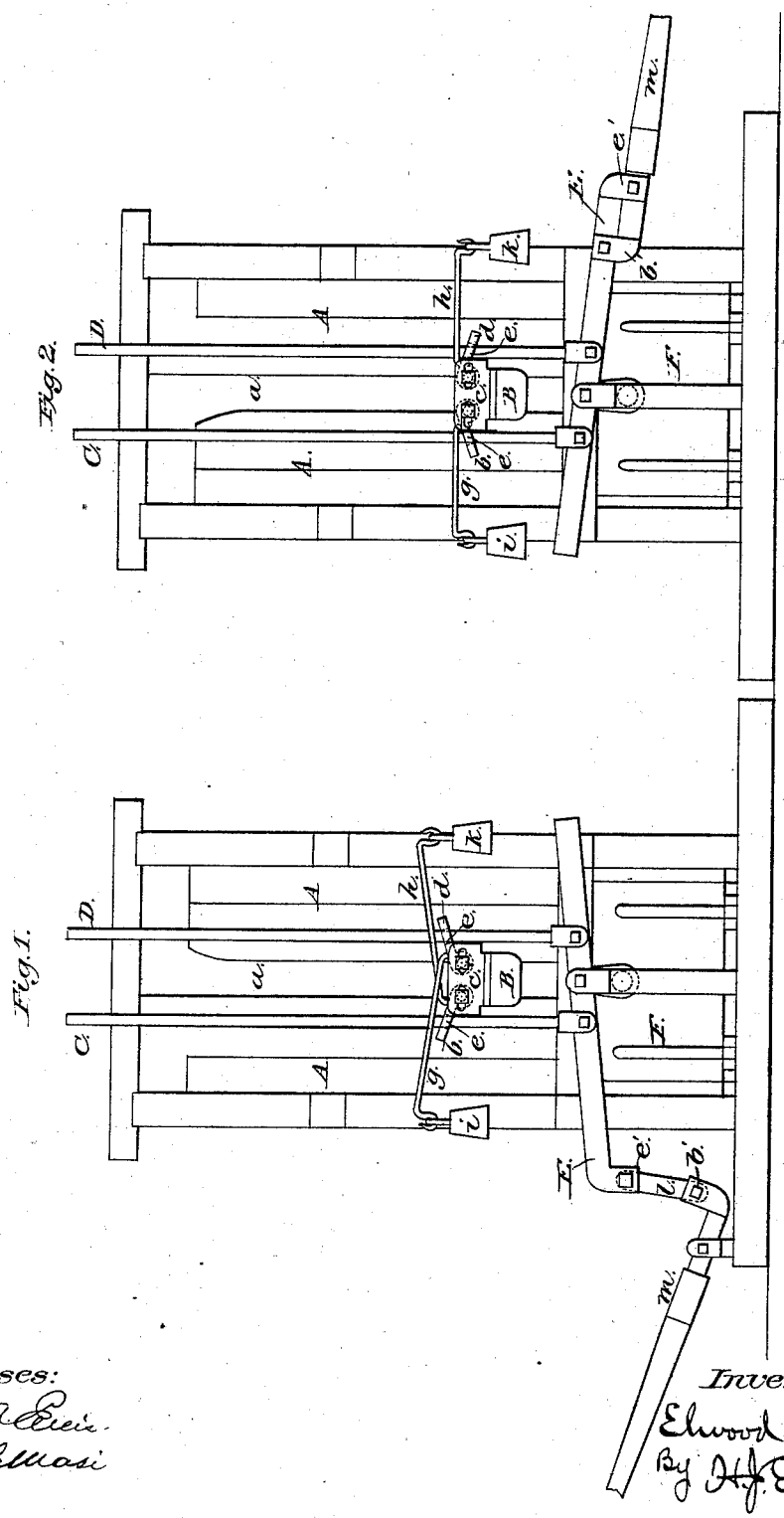

UNITED STATES PATENT OFFICE.

ELWOOD BEADLE, OF FLORENCE, ALABAMA.

IMPROVEMENT IN HAY AND COTTON PRESSES.

Specification forming part of Letters Patent No. 216,642, dated June 17, 1879; application filed March 14, 1879.

*To all whom it may concern:*

Be it known that I, ELWOOD BEADLE, of Florence, in the county of Lauderdale and State of Alabama, have invented certain new and useful Improvements in Hay and Cotton Presses; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a side elevation, showing the operating mechanism in position to raise the follower; also, lever compounded. Fig. 2 is also a side elevation of the opposite side of the press, showing the mechanism in position to compress the bale, the lever being shown connected as a simple one.

This invention has relation to presses for baling hay, cotton, and the like; and it consists of certain improvements in the construction and operation of the same hereinafter more fully described, and particularly pointed out in the claims.

In the accompanying drawings similar letters of reference indicate like parts of the invention.

A is a box-frame of a baling-press as usually constructed, the follower working through the slots $a$ in the side of the frame. The ends B of the follower, extending through the slots $a$, are provided at their extreme ends with a metal frame, $c$, in which is pivoted a pair of flat steel dogs, $b$ and $d$. These dogs $b$ and $d$ are provided with circular holes $e\ e$, through which pass a pair of rods, C and D, their lower ends being connected, one on each side of the fulcrum of a lever, E. The dogs $b$ and $d$ are further provided with rods $g$ and $h$, having weights $i$ and $k$.

The rods $g$ and $h$ are pivoted to the dogs $b$ and $d$ in such a manner that they may take the positions shown in Figs. 1 or 2.

The object of this arrangement is as follows: The holes $e\ e$ in the dogs $b$ and $d$ are a little larger than the rods C and D, so that the dogs will incline either up or down—as, for example, in Fig. 2 they are inclined down—and as the lever E is raised the rod C is securely held by the peculiar "biting" operation of the sharp corners of the dog $b$, and drawn down by the motion of the lever. At the same time the rod D is pushed up through the other dog, $d$. At the downward motion of the lever E, the operation with respect to the dogs is reversed, while the object accomplished is the same—that is, the dog $d$ is held fast and drawn down, and the rod C passes upward through the dog $b$. By continuing this operation the follower is gradually forced down to its full extent, thus compressing the bale.

After the bale is compressed and secured or tied in the usual manner, the pressure of the follower may be readily taken from it to allow of its removal by swinging the rods $g$ and $h$ in the position shown in Fig. 1 and operating the lever E, the biting operation of the dogs $b$ and $d$ being reversed, causing the follower to ascend to admit of the box being refilled.

The lever E is provided with ears $e'$ at longer end, which receive a small pitman, $l$. (Shown in Fig. 1.) The lower end of the pitman $l$ is connected to the shorter end of another lever, $m$, provided with ears $b'$, similar to those on the lever $m$. The lever $m$ has its fulcrum on the bed-plate of the press.

By removing the pitman $l$ and connecting the levers E and $m$, as shown in Fig. 2, a simple lever is formed.

Having thus described my invention and the manner of operating the same, what I claim as new and useful, and desire to secure by Letters Patent of the United States, is—

1. In a baling-press, the follower B, provided with the dogs $b$ and $d$, having the reversible weights $i$ and $k$, or their equivalents, in combination with the rods C and D and lever E, substantially as shown and described.

2. In a baling-press, the levers E and $m$, pitman $l$, and rods C and D, in combination with the dogs $b$ and $d$, having the rods $g$ and $h$, and weights $i$ and $k$, substantially as shown and described.

In testimony that I claim the foregoing as my own I affix my signature in presence of two witnesses.

ELWOOD BEADLE.

Witnesses:
JAMES K. JACKSON,
WM. M. JACKSON.